Patented Oct. 14, 1952

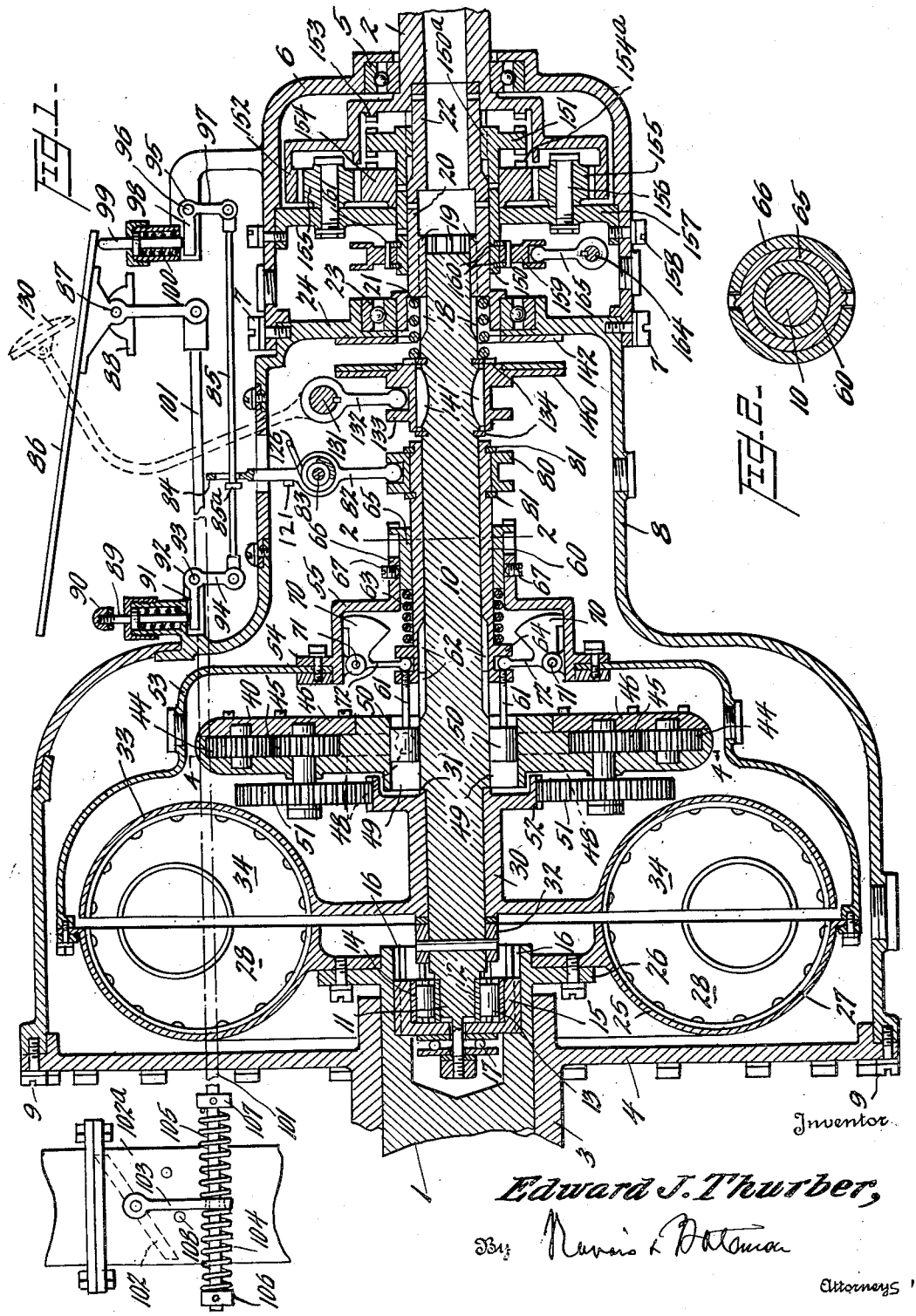

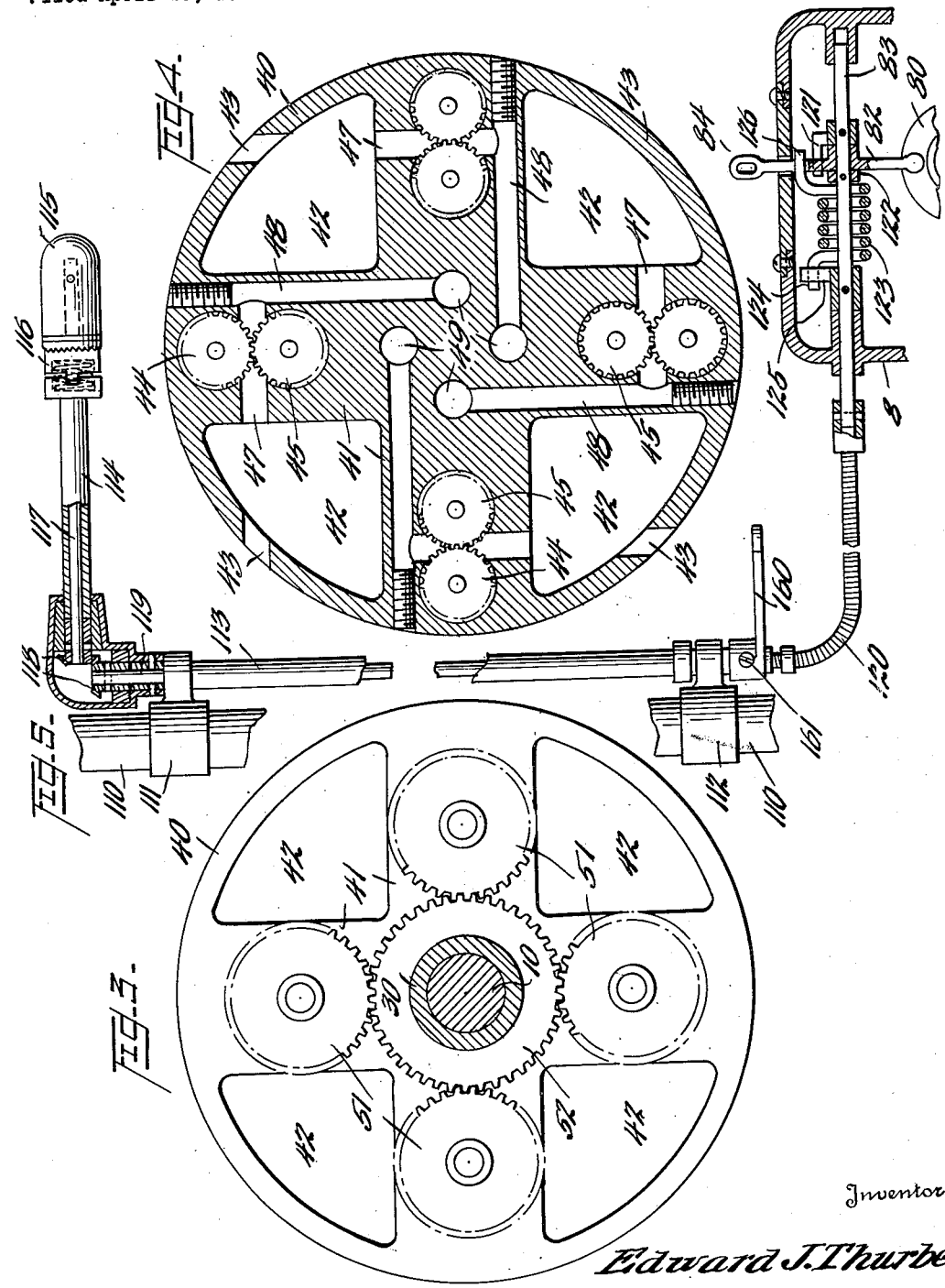

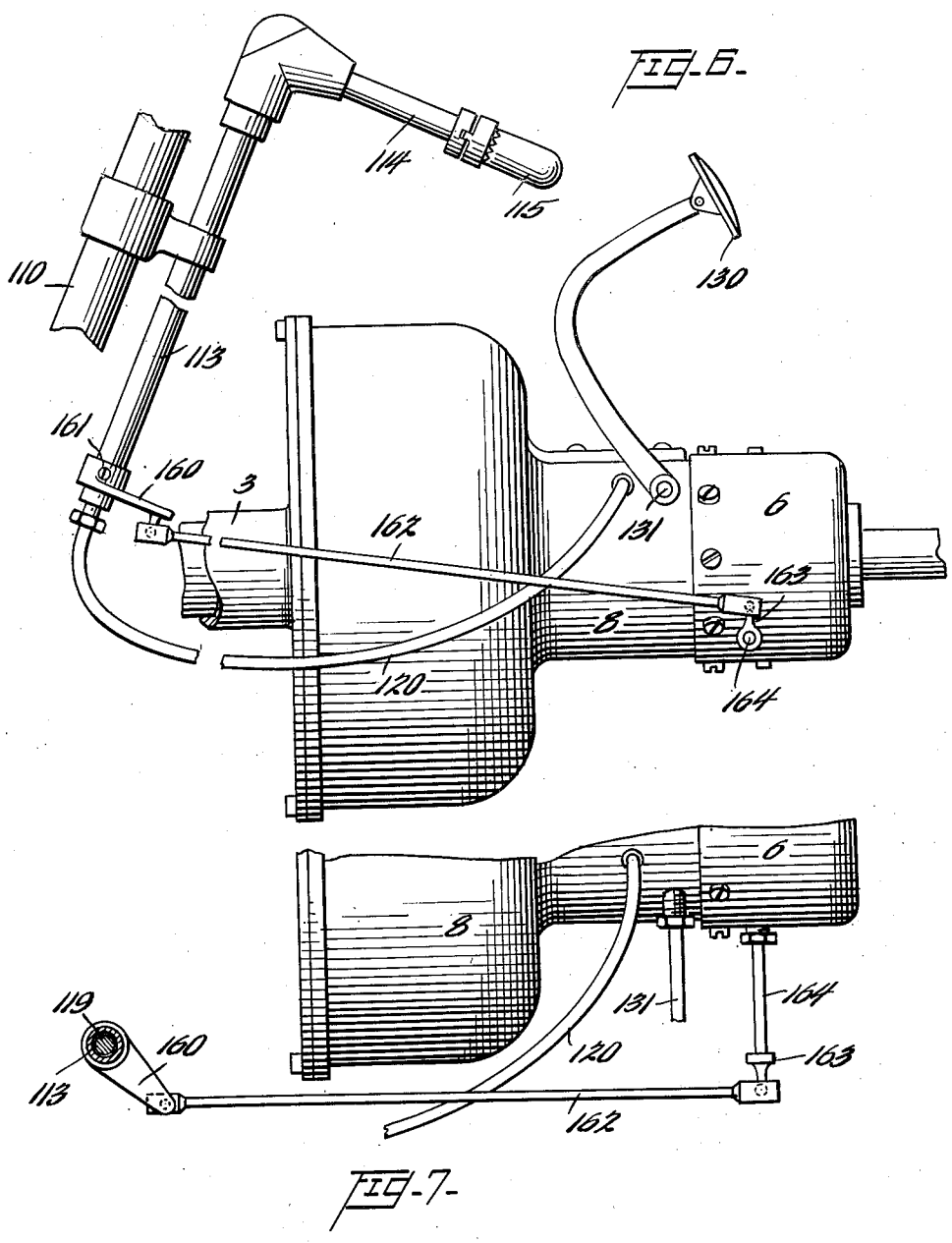

2,613,772

UNITED STATES PATENT OFFICE 2,613,772

POWER TRANSMISSION MECHANISM

Edward John Thurber, New Orleans, La., assignor to The Thurber Corporation, New Orleans, La., a corporation of Louisiana Application April 19, 1945, Serial No. 589,180

33 Claims. (Cl. 192—.07)

The present invention relates to improvements in power transmission mechanisms of the class adapted for use in starting and stopping and controlling the operation of machines or mechanisms of various kinds, and more particularly of automobiles and other automotive vehicles for controlling the transmission of torque and varying the ratio of speed between the engine or driving means and the propelling means.

One of the primary objects of the invention is to overcome limitations in and to simplify the structure of transmissions of the type employing a fluid coupling as heretofore employed in automobiles.

Another object is to provide an improved transmission mechanism employing a fluid coupling which may be controlled automatically, semi-automatically or manually.

Another object is to provide transmission mechanism employing a fluid coupling and having means whereby more effective torque control is provided than is obtainable with such transmission mechanisms as heretofore constructed.

Another object is to provide an improved transmission of the fluid coupling type which avoids or overcomes drag between the driving and driven members of the coupling while in neutral, as when an automobile equipped therewith is stopped and the engine is idling, and which has heretofore caused the automobile to creep unless prevented by applying its brakes.

Another object is to provide an improved transmission mechanism which embodies a combination of a primary fluid coupling of the kinetic type and a secondary fluid coupling capable of varying infinitely the torque transmitted thereto from the primary fluid coupling.

Another object is to provide a novel transmission mechanism embodying primary and secondary fluid couplings, and wherein the torque delivered by the primary fluid coupling may be transmitted through the secondary fluid coupling from zero to maximum without varying the speed of the driving member of the primary fluid coupling, or the secondary fluid coupling may be locked out and the primary fluid coupling employed to transmit the torque direct and relatively to the speed of the driving member of the primary fluid coupling.

Another object is to provide a transmission mechanism of the fluid coupling of the kinetic type having simple means for transmitting the torque in either a forward or a reverse direction.

A further object of the invention is to provide a simple and improved form of reverse gearing for transmission mechanisms.

To these and other ends, the invention consists in certain improvements and combinations and arrangements of parts, all as will be hereinafter described in detail, the features of novelty being pointed out more particularly in the claims at the end of this specification.

In the accompanying drawings:

Figure 1 is a longitudinal vertical section of transmission mechanism constructed in accordance with the present invention.

Figure 2 is a detail section taken on the line 2—2 in Fig. 1.

Figure 3 is an elevation of the secondary fluid coupling as viewed from the left in Fig. 1.

Figure 4 is a vertical section taken on the line 4—4 in Fig. 1.

Figure 5 is a detail view of the manual control means for the transmission mechanism.

Figure 6 is an elevation of the transmission mechanism, showing the manual controlling means connected thereto.

Fig. 7 is a part plan and part section of Fig. 6.

Similar parts are designated by the same reference characters in the several figures.

The invention is shown in the present instance as applied to the transmission mechanism of the type adapted to be used on automobiles, motor boats and other automotive vehicles for transmitting torque between the engine or power plant and the wheels or other propelling means, although it will be understood that the invention is applicable also to power transmissions for various other kinds of machines or machinery where control of the starting and stopping, the power applied and the speed of operation thereof is desired.

In the present instance, 1 represents the input or driving shaft, such as the crank shaft of the engine of an automobile, by which power is delivered to the transmission mechanism; and 2 represents the output or driven shaft through which power from the transmission mechanism may be transmitted to the driving wheels of the automobile in the usual and well known manner. The driving shaft may be mounted in a bearing 3 formed in or supported by the front plate 4 of a stationary casing enclosing the transmission mechanism, and the shaft 2 may be mounted in a bearing 5 in a rear casing section 6, the latter being preferably secured, as by screws 7, to the rear end of an intermediate casing section 8, and the forward end of the intermediate section being suitably secured, as by screws 9, to the front casing section 4.

An intermediate or rotor shaft 10 extends between the shafts 1 and 2 and in alinement therewith, the forward end of the shaft 10 having a pilot 11 thereon which is fitted into the inner race 12 of a roller or other anti-friction bearing 13, the outer race 14 of this bearing being fitted into a bearing carrier 15 which has splines thereon meshing with splines 16 formed in the rear end of the driving shaft, a thrust bearing 17 being provided at the forward end of the bearing carrier so that the bearing carrier rotates with but is movable with the shaft 10 in a direction axially of the driving shaft. The rear end of the rotor shaft is provided with splines 18 which cooperate with splines 19 formed in a sleeve 20 and provide a driving connection between the latter and the rotor shaft 10 but permit the shaft 10 to move axially relatively to the sleeve 20. A pre-loaded spring 21 is interposed between the forward end of the sleeve 20 and the rear portion of the rotor shaft 10, and acts to yieldingly hold the shaft 10 in its forward position toward the driving shaft 1. The sleeve 20 is provided at its rear end with a pilot 22 which fits rotatably in the driven or propeller shaft 2, and the forward end of this sleeve is preferably supported by an anti-friction or other suitable bearing 23 which is preferably mounted in a transverse wall 24 which may serve as means to close the rear end of the intermediate casing section 8 and to provide a dividing partition to separate the interior thereof from the rear casing section 6 which is employed as a gear box.

The engine or driving shaft 1 drives the pump or driving element of a primary fluid coupling, this coupling, as shown, being of the well known kind employed in automobiles of the kinetic type comprising an annular vaned driving member which acts as a centrifugal pump and a juxtaposed complemental annular vaned driven member which acts as a motor. Since the construction and mode of operation of fluid couplings of that type are well known, it is believed to be sufficient to describe such coupling generally as comprising a driving member 25 the hub of which is bolted to a flange 26 on the driving shaft or otherwise fixed thereto to rotate therewith and having an annular peripheral chamber 27 of semicircular cross section which is divided at intervals in its circumference by radial vanes 28 into passages in which fluid such as oil flows outwardly under centrifugal pressure developed by rotation of the driving or pump member. The complemental driven or motor member of this fluid coupling has a hub 30 which is mounted rotatably on the shaft 10 and is confined axially thereon between a shoulder 31 on said shaft and a collar 32 which is pinned or otherwise fixed on said shaft. This driven coupling member has an annular peripheral chamber 33 of semicircular cross section which is divided at intervals in its circumference by radial vanes 34 into passages adapted to receive oil from the driving or pump member while the driven member is not rotating or is rotating at a lower speed than that of the driving member of the coupling, the oil thus received by the driven member flowing inwardly therein toward its center and thus developing a driving torque upon the driven or motor member the magnitude of which depends upon the difference in relative speed between the driving and driven members of the coupling, as well understood.

The present invention provides a secondary fluid coupling between the primary fluid coupling just described and the driven shaft 2, which combination removes many of the limitations and overcomes certain objections found in the use of fluid couplings of the kinetic type as heretofore employed. The secondary fluid coupling provided according to the present invention comprises a rotor 40 which is formed integrally with or otherwise fixed to the shaft 10, this rotor, as shown in detail in Figs. 3 and 4, consisting of a circular body having a suitable number of radial arms or spokes 41 therein, and chambers 42 between the arms and communicating with the exterior of the rotor through passages 43. Each of these arms is recessed and contains the gears 44 and 45 of a gear pump, these gears being enclosed by a cover plate 46, and each pump is provided with an inlet passage 47 leading from the respective chamber 42, and a discharge passage 48 leading therefrom inwardly to a valve chamber 49 which is adjacent to the center of the rotor and extends parallel to the axis thereof. A valve 50 is mounted slidably in each of the chambers 49, and each valve chamber 49 and valve 50 constitutes valve means which controls flow of oil or fluid to the respective valve chamber 49 from the respective pump discharge passage 48. The driving shaft of each pump gear 45 has a gear 51 fixed thereto, and these gears mesh with and are driven from a central gear 52 which is formed on or otherwise fixed to the hub 30 of the motor or driven member 33 of the primary fluid coupling. The secondary fluid coupling is enclosed by an annular casing 53 having an outer peripheral portion bolted or otherwise fixed to the outer periphery of the driving member 25 of the primary fluid coupling so as to have a fluid-tight fit therewith and to be closed at the front thereby, and the rear inner edge of this casing is bolted or otherwise secured to the flange 54 of a housing 55 which surrounds the shaft 10. The coupling member 25 and casing 53 thus provide an enclosure or reservoir to contain a sufficient quantity of oil or other suitable fluid to maintain an adequate supply thereof for the operation of the primary and secondary fluid couplings.

The valves 50 for the secondary fluid coupling are controlled by a sleeve 60, to which they are connected by valve stems 61. The sleeve 60 is slidable axially on the shaft 10 to move the valves axially in their chambers 49, and is constrained to rotate with said shaft and the valves by splines 62 on the shaft 10 and within the sleeve. The valves are urged toward open position by a spring 63 which encircles the sleeve 60, one end of this spring bearing against a collar 64 on this sleeve and the other end thereof bearing against a bushing 65 which fits loosely over the sleeve 60 and is secured in different adjusted positions axially within the hub 66 of the housing 55 by set screws 67 whereby the power of the spring may be adjusted as required.

Means is provided for controlling the valves 50 automatically according to the speed of rotation of the driving shaft, whereby the fluid will circulate freely, or substantially so, and no torque will be transmitted through the secondary fluid coupling while the driving shaft is rotating at relatively low speed and the driven shaft is at rest, as during idling of the engine while an automobile is stopped, and the resistance to such circulation of fluid and the consequent torque transmitted through the secondary fluid coupling will be increased as the speed of rotation of the driving shaft is increased. For this purpose, a governor is provided which is responsive to the speed of the driving shaft and controls accordingly the valves of the secondary fluid coupling. This governor, as shown in the present instance, is of the centrifugal type comprising a suitable number of weights 70 mounted within the housing 55 and pivoted to the inner wall thereof at 71, each of these weights having an arm 72 thereon which engages in a peripheral groove in the collar 64. While the driving shaft is at rest or is rotating at relatively low speed, the spring 63 will hold the governor weights in their inner position and the valves 50 in their fully open position, and consequently the fluid will circulate freely through the secondary fluid coupling and no torque will be transmitted therethrough, but when the speed of rotation of the driving shaft is increased, the governor weights will swing outwardly by centrifugal force, thereby moving the valves 50 toward or to closed position against the action of the spring 63, thereby obstructing partially or completely circulation of fluid through the secondary fluid coupling and consequently causing torque to be transmitted therethrough of a magnitude depending on the extent of closing of the valves.

Means is also provided for manually controlling the valves 50 of the secondary fluid coupling. For this purpose, the valve controlling sleeve 60 is provided with a grooved collar 80 which is connected to move axially therewith by a pair of snap rings 81, this collar being engaged by the lower end of a lever 82 which is pivoted on a shaft 83 mounted in the sides of the intermediate casing section 8 and the upper end of which extends through a slot in the top of said casing section and is provided with an eye 84 through which a rod 85 extends, this rod having a collar 85a fixed thereon at a point where it will be normally spaced from said eye. The rod 85 serves to operate the lever 82 to partially or fully open the valves 50, over-riding the action of the governor to close said valves. The rod 85 may be operated manually in any desired manner, but it is preferably operated by the usual accelerator pedal or fuel control element of an automobile. As shown in the present instance, 86 represents the usual accelerator pedal for controlling the fuel supplied to the engine of an automobile, it being pivoted at 87 on a suitable support 88 to rock forwardly and rearwardly. A spring plunger 89 is mounted beneath the forward or toe end of the accelerator pedal in a position to be engaged and depressed by said end of said pedal when the latter is depressed beyond the fully open position of the throttle of the engine, the upper end of the plunger being provided with a cap 90 which is threaded thereon and thus adjustable into a position to be engaged by the toe end of the accelerator pedal when it has been depressed beyond a predetermined position. The plunger 89 is normally held in its raised inactive position by a spring, the lower end of the plunger being then immediately above an arm 91 of a bell-crank lever 92 which is pivoted, as at 93, on a suitable support, such as the upper side of the casing section 8, the other arm 94 of this bell crank lever being pivotally connected to the rod 85. Depression of the accelerator pedal beyond its fully open throttle position will bring the forward or toe end of said pedal into engagement with the top of the plunger 89, and further depression of said pedal will depress said plunger, and will rock the bell-crank lever 93 in a direction to push the collar 85a on the rod 85 against the lever 82 and to rock the latter in a direction to push the valves 50 more or less toward open position, depending on the extent to which the forward or toe end of the accelerator pedal is depressed. Such an operation relieves, more or less, the obstruction to circulation of fluid through the secondary fluid coupling, thereby relieving correspondingly the load on the engine and enabling the engine to increase its speed and, consequently, the torque transmitted through the secondary fluid coupling. Such an operation is useful especially when the operator of an automobile desires to accelerate its speed beyond the capacity of direct drive.

Means is also provided for operating the rod 85 to open the valves 50 of the secondary fluid coupling under control of the accelerator pedal or fuel control element when the automobile is to be stopped. Such means comprises a second bell-crank lever 95 pivoted on a suitable support, such as the top of the transmission casing and having an arm 97 pivotally connected to the rod 85. The other arm 98 of this bell-crank lever is normally positioned beneath a plunger 99 which is yieldingly held in raised position by a spring 100. The upper end of this plunger is located beneath the rear or heel end of the accelerator pedal at a height to be engaged and depressed by said end of said pedal, when rocked to or beyond throttle closed position, sufficiently to operate through the rod 85 to fully open the valves 50 and thereby permit free circulation of fluid through the secondary fluid coupling and to interrupt the transmission of torque therethrough. Return of the accelerator pedal to its normal range of throttle controlling operation will permit the plungers 89 or 99 to return to normal position and thereby relieve the valves 50 of the influence thereof. In order to permit the accelerator pedal to be rocked forwardly beyond its fully-open throttle position, or to be rocked rearwardly beyond its fully-closed throttle position, the rod 101 connected to the accelerator pedal for operating the throttle 102 in the fuel intake 102a of an automobile or other engine for driving the pump 25 of the primary fluid coupling, extends movably through the throttle operating lever 103 and is arranged to act yieldingly thereon through a pair of springs 104 and 105 which are interposed between the respective sides of the lever 103 and a pair of collars 106 and 107 secured in suitable positions on the rod 101. As shown in Fig. 1, the lever 103 rests against a stop 108 when in the usual closed throttle position or the position in which the engine idles. Depression of the accelerator pedal to open the throttle is transmitted to the lever 103 through the spring 104, and when the pedal is depressed beyond fully-open-throttle position, the spring 104 will yield and thereby permit such movement; and rocking of the accelerator pedal rearwardly to permit closing of the throttle is transmitted to the throttle lever 103 through the spring 105, and rearward rocking of the accelerator pedal beyond its full-closed-throttle position, at which time the lever 103 rests against the stop 108, is permitted by yielding of the spring 105.

Means is also provided for manually controlling the valves 50 of the secondary fluid coupling by means located on the steering column or in a position within convenient reach of the hand of the automobile operator. Such means is shown in detail in Fig. 5 wherein 110 represents portions of the conventional steering column of an automobile having brackets 111 and 112 thereon which rotatably support a tube 113. The upper end of this tube has a hand lever 114 fixed thereto, and this lever is provided with a hand grip 115 which is rotatable on the longitudinal axis of said lever. A spring-pressed toothed detent 116 serves to hold the hand grip in the different positions into which it may be rotated. The hand grip is connected to a shaft 117 mounted rotatably in the lever 114, and this shaft is connected by bevel gears 118 to a shaft 119 extending longitudinally in the tube 113, the lower end of the shaft 119 being connected to a flexible shaft 120 which extends to the transmission mechanism and is connected to the shaft 83 which extends loosely through the lever 82. The shaft 83 has a dog 121 pinned or otherwise fixed thereon, this dog being located at the left-hand side of the lever 82 so that clockwise rotation of the hand grip 115, which causes corresponding rotation of said dog, will rock the lever 82 to over-ride the governor and move the valves 50 to the left toward or into open position, thus reducing or interrupting transmission of torque through the secondary fluid coupling. The lever 82 is maintained in a central position on the shaft 83 by the hub of the dog 121 which engages it at one side, and by a collar 122 which is pinned to said shaft and engages the other side of said lever.

Means under control of the hand grip 115 is also provided for holding the valves 50 in closed position against the action of the spring 63, thereby maintaining the secondary fluid coupling in a condition for the transmission of full torque therethrough. Such means, as shown in the present instance, comprises a spring 123 which is stronger than the valve-opening spring 63, the spring 123 being wound around the shaft and having one end 124 arranged to be engaged by a dog 125 pinned on the shaft 83 and its other end 126 arranged to engage the lever 82 when the hand grip 115 is rotated in an anti-clockwise direction. The ends of the spring 123 do not contact with either the dog 125 or the lever 82 when the latter is rocked toward the right to open the valves 50, thus permitting full rocking movement of the lever 82 in a direction to open the valves. However, when the hand grip 115 is rotated in an anti-clockwise direction, the dog 125 engages the end 124 of the spring 123 and the end 126 of the latter engages the right hand side of the lever 82, and by applying sufficient force to the hand grip to rotate it in said direction, the lever 82 may be rocked by a force which overcomes the valve-opening spring 63 and thereby closes the valves 50. The secondary fluid coupling is thereby locked out, and will remain in that condition until the hand grip is rotated back to its normal position. The hand-grip control thus provided is therefore able to over-ride the governor at the will of the operator, and may be employed to hold the valves 50 in a partially open position which is equivalent to holding the transmission in a lower gear than direct drive, and it may also be employed to hold the transmission in direct drive or in condition for full torque transmission.

Means is further provided whereby the operator of the automobile may over-ride the governor control and the accelerator pedal and hand grip controls and open the valves 50, thus interrupting transmission of torque through the secondary fluid coupling. Such means is controlled by a foot pedal 130, which may take the place of the usual clutch pedal of the conventional automobile. This pedal is fixed to a shaft 131 which extends across and is mounted rotatably in the side walls of the transmission casing, and has an arm 132 fixed thereon, this arm engaging in a grooved collar 133. This collar is mounted on the shaft 10 and is confined from axial movement thereon as by snap rings 134. Should the operator of the automobile desire to relieve the torque entirely, such may be accomplished by depressing the pedal 130. Such an operation of this pedal moves the shaft 10 rearwardly against the action of the spring 21, thereby separating the fluid motor 33 from the fluid pump 25 of the primary fluid coupling, and also moving the rotor 40 of the secondary fluid coupling and the valve chambers 49 rearwardly relatively to the valves 50 which are held from such movement by the sleeve 60, the valves being thereby opened and providing free fluid circulation through the secondary fluid coupling, and thereby completely interrupting transmission of torque therethrough.

The present invention also provides means for overcoming drag between the rotating pump or driving member 25 and the motor or driven member 33 of the primary fluid coupling which heretofore, in automobiles equipped with such a fluid coupling, tends to cause such automobiles to creep while stopped and the engine is idling. Such creeping tendency is reduced by the separation of the driving and driven members of the fluid coupling, but it is overcome and prevented entirely by concurrently applying a brake comprising in the present instance, a friction brake disk 140 fixed to the collar 133 which, in turn, is fixed to the shaft 10, as by keys 141, and a cooperating friction brake disk 142 which is fixed non-rotatably in the transmission casing, as for example, to the wall 24 thereof. By depressing the pedal 130 sufficiently far, the brake disk 140 is pressed frictionally against the brake disk 142, thereby stopping and holding the shaft 10 from rotation.

The present invention further provides a novel and improved gearing whereby the driven shaft 2 may be driven in either forward or reverse direction. Such gearing, which is preferably enclosed in the gear-box provided by the casing section 6, comprises a sleeve 150 which is splined by the splines 150a to the sleeve 20 to rotate therewith but to move axially thereon, the sleeve 150 having fixed thereon a clutch member 151 provided with clutch teeth on its opposite sides, an internal gear 152 fixed to the driven shaft and having clutch teeth 153 thereon adapted to be engaged by the clutch teeth on one side of the clutch number 151, a gear 154 mounted rotatably on the sleeve 150 and through which the latter is slidable, said gear having clutch teeth 154a thereon adapted to be engaged by the clutch teeth on the other side of the clutch member 151, a suitable number of pinions 155 mounted rotatably on stud shafts 156 which are fixed in the casing, as by threading them into a plate 157 secured in fixed position within the transmission casing, as by screws 158, said pinions being interposed between and meshing with the gears 152 and 154, and a clutch shifting collar 159 which may be secured to the sleeve 150 by snap rings 160 at its opposite sides, which are locked in their grooves in the sleeve 150 by pins 161 inserted through the collar. Sliding the sleeve 150 toward the right in Fig. 1 engages the clutch teeth on the right-hand side of the clutch member with the clutch teeth 153 on the gear 152, thereby providing a direct forward drive between the rotor shaft 10 and the driven shaft 2 through the sleeve 20 which is splined to the shaft 10, and the sleeve 150 which is splined to the sleeve 20; and sliding the sleeve 150 toward the left in Fig. 1 engages the teeth on the left-hand side of the clutch member 151 with the clutch teeth 154a on the gear 154, thereby clutching this gear, through the sleeves 150 and 20, to the shaft 10. Forward rotation of the gear 154 will cause rotation of the pinions 155 in a relatively reverse direction, and these pinions meshing with the larger gear 152 will cause the latter to be driven in a reverse direction and at a relatively lower speed relatively to the shaft 10. The clutch member 151 may be shifted by any desired means, it being shifted preferably by the hand lever 114 located on the steering column of an automobile, the tube 113 mounted rotatably on the steering column being provided in the present instance with a lever 160 which is fixed to the lower end of the tube 113, as by a set screw 161, and pivotally connected to one end of a rod 162, the other end of the latter being pivotally connected to a lever 163 on the outside of the transmission casing. The lever 163 is fixed to a shaft 164 which extends transversely within the transmission casing and is rotatably mounted in its side walls, and this shaft has a shifting fork 165 keyed or otherwise fixed thereon. In such a control, swinging of the hand lever 114 forwardly will rotate the tube 113 about its axis and, through the levers 160 and 163 and connecting rod 162, will rock the fork 165 rearwardly in Fig. 1, and thereby establish direct forward drive from the shaft 10, through sleeves 20 and 150, clutch member 151 and clutch teeth 153 and gear 152, to the driven shaft 2; and swinging of the hand lever 114 rearwardly disengages the clutch members 151 from the clutch teeth 153 and engages it with the clutch teeth 154a on the gear 154, causing the latter to be driven in a forward direction from the shaft 10, through the sleeves 20 and 150, thereby rotating the pinions 155 and gear 152, and the driven shaft 2, in reverse direction relatively to the shaft 10, the ratio of the gear 154, pinions 155 and 152 providing a reduction gearing for the reverse driving of the driven shaft.

The operation of transmission machanism constructed as hereinbefore described is as follows: Assuming that the proper amount of oil or other suitable fluid has been placed in the casing 53 to maintain a supply thereof as the operating fluid for the primary and secondary fluid couplings, and that the engine is running, the pump or driving member 25 of the primary coupling member is caused to rotate, throwing the oil to the periphery thereof by centrifugal force, and the oil thus circulated is received by the motor or driven member 33 of the primary fluid coupling, causing this member and the gear 52 thereon to rotate, said gear causing the gear pumps in the rotor 40 of the secondary fluid coupling to operate. At relatively low engine speed, as while the engine of an automobile is idling, the spring 63 will hold the valves 50 fully open or toward the left in Fig. 1, as the governor weights cannot then overcome the spring 63 and will occupy their inner position. While the valves 50 are in fully open position, they will uncover and permit full flow of oil from the respective discharge passages 48 of the gear pumps, and under these conditions, no torque will be transmitted to the rotor shaft 10, and the clutch member 151 may be shifted by the hand lever 114 to place the transmission in gear for either forward or reverse drive.

An increase in engine speed, as caused by depressing the accelerator pedal 86, will cause the governor weights 70 to overcome the spring 63 and to swing outwardly toward the position shown in Fig. 1, thereby moving the valves 50 toward closed position and correspondingly restricting the discharge of oil from the gear pumps through their discharge passages 48, and developing a torque through the secondary fluid coupling which is transmitted to the rotor shaft 10, and through the sleeves 20 and 150 and the clutch member 151 to the driven shaft 2. Further increase of engine speed swings the governor weights into their outermost position, as shown in Fig. 1, thereby closing completely the discharge passages 48 from the gear pumps, and developing full torque transmission through the secondary fluid coupling.

While the pump or driving member 25 and the motor or driven member 33 of the primary fluid coupling are rotating at substantially the same speed, a solid body of oil exists between these members. Such a condition is established immediately according to the present invention, since the driven member 33 of the primary fluid coupling is free to attain the same speed of rotation as that of the driving member 25 until the governor begins to close the valves 50, the rotor 40 consequently lagging behind the driven member 33 to an extent which depends on the differential between the governor and the spring 63.

However, while the driving member 25 and the driven member 33 of the primary fluid coupling may continue to rotate in unison, the secondary fluid coupling, according to the present invention, enables the torque transmitted from the primary fluid coupling to the driven shaft to be varied to meet different requirements, at the will of the operator, and furthermore such variations in torque transmission may be accomplished without disturbing the solid body of oil between the driving and driven members of the primary fluid coupling.

If the automobile is being driven so that the driving and driven members of the primary fluid coupling are rotating in unison, and the driven shaft is being driven at the same speed as that of the engine or driving shaft, or substantially so, and it is desired to accelerate the speed of the automobile at a rate in excess of that provided by such driving conditions, such may be accomplished by depressing the toe of the accelerator pedal beyond the full-open-throttle position, thereby actuating the plunger 89, bell-crank 92, rod 85, lever 82 and sleeve 60 against the action of the governor to partially open the valves 50 thereby relieving to a corresponding extent the restriction to fluid flow through the gear pumps of the secondary fluid coupling and allowing the engine driving the primary coupling to increase its speed, the effect of which will be to increase the torque transmitted through the secondary fluid coupling to the driven shaft, and to enable the automobile to accelerate its speed more rapidly in a manner comparable with shifting to a lower gear in a transmission of conventional gear type. Return of the accelerator pedal to its normal range of throttle controlling position will enable the governor to automatically return the valves to fully closed position for driving the driven shaft at the same speed as that of the driving shaft. A similar variation of torque transmitted through the secondary fluid coupling may be effected by rotating the handgrip 115 on the steering column, this control embodying the additional feature of providing means for holding the valves at any desired extent of opening for the transmission of the desired amount of torque as may be required.

Should the operator desire to stop the automobile, as at a crossing, the accelerator pedal may be rocked rearwardly, thereby depressing the rear or heel end of the pedal and thus causing the plunger 99 to be depressed. Depression of this plunger actuates the lever 82, through the bell-crank 97 and rod 85, in a direction to open the valves 50, thereby interrupting the transmission of all torque through the secondary fluid coupling. The plunger 99 may be positioned for actuation by the heel end of the accelerator pedal by simply releasing the accelerator pedal and allowing it to return to closed-throttle position, or for actuation by rearward movement of the accelerator pedal beyond closed throttle position.

If it is desired to lock out the secondary fluid coupling, such may be accomplished by rotating the hand grip 115 in an anti-clockwise direction, thereby causing the spring 123 to engage the lever 82 and to rock said lever in a direction to fully close the valves 50, the spring 123 being sufficiently strong to over-ride the spring 63. The transmission will then operate like the usual fluid coupling of the kinetic type, variation of torque and speed being produced by varying the speed of rotation of the pump or driving member 25.

If it is desired to interrupt suddenly and entirely the torque between the driving and driven shafts, such may be accomplished by depressing the pedal 130, the effect of which is to separate the driven member 33 from the driving member 25 of the primary fluid coupling and to open the valves 50 of the secondary fluid coupling and thereby interrupt transmission of torque therethrough. By depressing the pedal 130 to a further extent, the brake disk 140 is engaged frictionally with the brake disk 142, thereby stopping any rotation of the rotor shaft, and if the clutch member 151 is then engaged with the clutch teeth 153 on the driven shaft 2, the driven shaft will be locked from rotation thereby effectively applying a brake action on the motor vehicle. The brake 140, 142, when applied, will thus overcome any tendency of the automobile to creep due to the drag of the driving member 25 on the driven member 33, and will also facilitate engagement of the clutch member 151 to set the transmission for forward or reverse. The features of separating the driving and driven members 25 and 33 and/or applying the brake to overcome drag between said members are also applicable to automobiles as heretofore equipped with the so-called fluid coupling.

The present invention provides transmission mechanism comprising a primary fluid coupling and a secondary fluid coupling which receives torque from the primary coupling, the secondary coupling providing means for varying the torque transmitted thereby from zero to full or maximum torque without varying the speed of rotation of the driving shaft. Such a combination enables the motor or driven member of the primary coupling to attain engine speed at any time without delivering any torque, which is not possible with fluid couplings of the kinetic type as heretofore used, and when the secondary fluid drive is in full hydraulic lock, it enables the torque transmitted to the driven shaft to be controlled solely by variation of the speed of the engine driving the pump of the primary fluid coupling.

The governor, which is responsive to the speed of the engine driving the primary fluid coupling, may be set to cause full torque output to be transmitted through the secondary fluid coupling at any predetermined engine speed, thus permitting the motor or driven member of the primary fluid coupling to attain full engine speed while the secondary fluid coupling is rotating at a speed below engine speed, and the valves of the secondary fluid coupling, controlled by the accelerator pedal, hand grip or foot pedal, enable the amount of torque transmitted to the driven shaft through the secondary fluid coupling to be varied or to be interrupted entirely, at the will of the operator, these manual controls being capable of over-riding the governor.

The present invention also provides a simple and improved gear box structure for affording forward and reverse drives for the driven shaft, it requiring only a single shiftable clutch member and a cooperating clutch member engageable thereby for forward drive, and a planetary gear set the driving gear of which is engageable by the shiftable clutch member. By placing the slidable sleeve for the shiftable clutch member within the central driving gear of the planetary gear set and extending the shifting collar therefor exteriorly of the gear set, the set is small and compact and the necessity of employing bands or friction clutches is avoided.

I claim:

1. Power transmission mechanism comprising a power input element, a primary fluid coupling embodying rotatable juxtaposed complemental vaned pump and motor members, said pump member being connected to the input element to be driven thereby, and said members being operative to transmit from one to the other a torque the magnitude of which is variable according to their relative speed of rotation, and a secondary fluid coupling embodying a driving member connected to said motor member of the primary fluid coupling to rotate therewith and a driven member to which torque is transmitted from said driving member, and means for varying the amount of torque transmitted between said driving and driven members of the secondary fluid coupling independently of the relative speed of rotation of said pump and motor members of the primary fluid coupling, said means for varying the amount of torque transmitted between the driving and driven members comprising a plurality of control elements operable manually at will and automatic control means, including speed responsive means for controlling said torque varying means of said secondary fluid coupling.

2. Power transmission mechanism according to claim 1, including an accelerator pedal controlling an engine for driving said pump member, and means controlled by said accelerator pedal for controlling said torque varying means.

3. Power transmission mechanism according to claim 1, including the throttle for an engine for driving said pump member and having an accelerator pedal controlling it, and means operable by movement of the accelerator pedal beyond full-open-throttle position for operating said torque varying means to increase torque transmission between said driving and driven members of the secondary fluid coupling.

4. Power transmission mechanism according to claim 1, including the throttle for an engine for driving said pump member and an accelerator pedal movable in opposite directions for respectively opening and closing the throttle, and means operable by movement of said pedal in throttle closing direction for operating said torque varying means to interrupt torque transmission between said driving and driven members of the secondary fluid coupling.

5. Power transmission mechanism according to claim 1, including the throttle for an engine for driving said pump member and having an accelerator pedal for opening and closing it, and means operable by said pedal when moved beyond closed-throttle position for operating said torque varying means to interrupt torque transmission between said driving and driven members of the secondary fluid coupling.

6. Power transmission mechanism according to claim 1, applied to an automobile having a steering column, and including a throttle operating element and means controlled thereby for controlling the operation of said pump member, and control means on the steering column for operating said torque varying means to control the torque transmission between said driving and driven members of the secondary fluid coupling.

7. Power transmission mechanism according to claim 1, applied to an automobile having a steering column, and including a throttle operating element and means controlled thereby for controlling the operation of said pump member, and control means on the steering column for operating said torque varying means to interrupt torque transmission between said driving and driven members of the secondary fluid coupling.

8. Power transmission mechanism according to claim 1, applied to an automobile having a steering column, and including a throttle controlling element and means controlled thereby for controlling the operation of said pump member, and control means on the steering column for operating said torque varying means to produce a fluid lock between said driving and driven members of the secondary fluid coupling.

9. Power transmission mechanism, comprising a rotor carrying pumping means for circulating a fluid, means for driving the pumping means, valve means movable relatively to the rotor in a direction parallel to the axis thereof for controlling said circulation of fluid, a fluid coupling comprising rotatable complementary annular driving and driven elements, the driven element being rotatable relatively to the rotor and connected to said driving means, and means for shifting the rotor and said driven element axially relatively to said valve means and driving element to concurrently control said circulation of fluid and vary the operative relation between the driving and driven elements of the fluid coupling.

10. Power transmission mechanism according to claim 9, including means for stopping rotation of said rotor and driven element when they are shifted in a direction to open said valve means and to separate said driven element from said driving element.

11. Power transmission mechanism, comprising a primary fluid coupling embodying rotatable complemental annular pump and motor elements, a secondary fluid coupling embodying a rotor carrying pumping means for circulating a fluid, and driving means for said pumping means and having means for driving it from said motor element, and a casing structure joined to the peripheral portion of said pump element and enclosing and forming a reservoir to supply operating fluid for the primary and secondary fluid couplings.

12. Power transmission mechanism, comprising a primary fluid coupling embodying rotatable complemental annular pump and motor elements, a secondary fluid coupling embodying a rotor carrying pumps for circulating a fluid, driving means for the pumps connected to the motor element of the primary fluid coupling to be driven thereby, and valves for controlling said circulation of fluid, speed responsive means for actuating the valves, and a plurality of means operable manually and at will for directly operating said valves.

13. Power transmission mechanism, comprising a primary fluid coupling embodying rotatable complemental annular pump and motor elements, a secondary fluid coupling embodying a rotor carrying pumps for circulating a fluid, driving means for the pumps connected to the motor element of the primary fluid coupling to be driven thereby, valves for controlling said circulation of fluid by said pumps, a spring acting on said valves to open them, speed responsive means operative on said valves upon increase of speed to close them against the action of said spring, and a plurality of controlling means operable manually and at will for directly operating said valves.

14. Power transmission mechanism, comprising a primary fluid coupling embodying rotatable complemental annular pump and motor elements, a secondary fluid coupling embodying a rotor carrying pumps for circulating a fluid, driving means for the pumps connected to the motor element of the primary fluid coupling to be driven thereby, valves for controlling said circulation of fluid by said pumps, a spring acting on said valves to open them, speed responsive means operative on said valves upon increase of speed to close them against the action of said spring, and manual means operative to over-ride said speed responsive means and open said valves.

15. A power transmission mechanism, comprising a fluid operated clutch embodying rotatable juxtaposed complementary vaned pump and motor members operative to transmit from one to the other a torque the magnitude of which is varied according to their relative speed of rotation, an accelerator pedal for an engine for driving said pump member, and another fluid operated clutch embodying a driving member connected to said motor member of said first mentioned fluid clutch and a driven member to which the torque is transmitted from said driving member and having means for changing the amount of torque transmitted between said driving and driven members independently of the relative speed of rotation of said pump and motor members, speed responsive means for controlling said torque changing means, and means controlled by said accelerator pedal for controlling said torque changing means.

16. Power transmission mechanism according to claim 15, including a throttle controlled by the accelerator pedal of the engine for driving said pump member, and means operable by movement of the accelerator pedal beyond full-open throttle position for operating said torque changing means to increase the magnitude of torque delivered to said driven member.

17. Power transmission mechanism according to claim 15, including a throttle for the engine for driving said pump member, and an accelerator pedal movable in opposite directions for respectively opening and closing the throttle, and means operable by movement of said accelerator pedal in throttle closing direction for operating said torque changing means to interrupt torque transmission between said driving and driven members of the second mentioned fluid operated clutch.

18. Power transmission mechanism according to claim 15, including a throttle for the engine for driving said pump member and connected to the accelerator pedal for opening and closing it, and means operable by said accelerator pedal when moved toward closed throttle position for operating said torque changing means to interrupt torque transmission between said driving and driven members of the second mentioned fluid operated clutch.

19. Power transmission mechanism according to claim 15, applied to an automobile having a steering column, and including a throttle operative by the accelerator pedal for controlling the operation of said pump member, and controlling means on the steering column for operating said torque changing means to control the torque transmission between said driving and driven members of the second mentioned fluid operated clutch.

20. Power transmission mechanism according to claim 15, applied to an automobile having a steering column, and including a throttle operative by the accelerator pedal for controlling the operation of said pump member, and controlling means on the steering column for operating the torque changing means to interrupt torque transmission between said driving and driven members of the second mentioned fluid operated clutch.

21. Power transmission mechanism according to claim 15, applied to an automobile having a steering column, and including a throttle operative by the accelerator pedal for controlling the operation of said pump member, and controlling means on the steering column for operating said torque changing means to produce a direct drive between the driving and driven members of the second mentioned fluid operated clutch.

22. Power transmission mechanism according to claim 15, applied to an automobile having a steering column and including speed responsive means, controlling means on the steering column, and means controlled by the speed responsive means and controlled selectively by the accelerator pedal and the controlling means on the steering column for operating said torque changing means of the second mentioned fluid operated clutch.

23. A fluid power transmission mechanism applied to an automobile having an engine for operating the transmission mechanism, a steering column, and a throttle for said engine for controlling the operation of said fluid power transmission mechanism, said transmission mechanism having means for controlling the transmission of torque therethrough including a controlling element mounted on the steering column, an accelerator pedal throttle controlling element, and a speed responsive controlling element, each of said controlling elements being operable independently of the other of said elements, and a master controlling element operable to override all of the other of said controlling elements.

24. A hydraulic power transmission mechanism for an automotive vehicle having an engine controlled by a throttle operative by an accelerator pedal, comprising a driving shaft and a propeller shafts hydraulically controlled means for transmitting torque between the driving and propeller shafts at varying speed ratios, valve means controlling the flow of a controlling fluid for said hydraulically controlled means, means for holding the propeller shaft from rotation, and means connected to said valve means and holding means and operable independently of operation of said throttle and accelerator pedal for interrupting transmission of torque between said driving shaft and propeller shaft and thereby placing the transmission mechanism in neutral condition and subsequently holding the propeller shaft from rotation and thereby effectively applying a brake action to the motor vehicle.

25. Power transmission mechanism as defined in claim 24, wherein said means for interrupting the transmission of torque and holding the propeller shaft includes a manually operable controlling element directly connected to said valve means and holding means.

26. A hydraulic power transmission mechanism for a motor vehicle having an engine controlled by a throttle operative by an accelerator pedal, comprising driving and driven shafts, hydraulic torque transmitting means for transmitting torque between the shafts, including a casing attached to said driving shaft and rotatable thereby, said casing containing fluid, and a pump member in said casing attached to the driving shaft and rotatable to circulate the fluid in the casing, a motor member in said casing in the path of the circulating fluid and rotatable by the circulating fluid to transmit torque to the driven shaft, a fluid controlled clutch in said casing for connecting the motor member to and disconnecting it from the driven shaft, and valve means responsive to the speed of rotation of one of said shafts or to movement of the accelerator pedal for controlling said fluid controlled clutch.

27. A hydraulic power transmission mechanism as defined in claim 26, wherein said valve means is responsive to the speed of rotation of the driving shaft for connecting the motor member to transmit torque to the driven shaft.

28. A hydraulic power transmission mechanism as defined in claim 26, including means for connecting the accelerator pedal to said valve means, and operable to render the fluid controlled clutch operative to transmit or to interrupt the transmission of torque by the circulating fluid to the driven shaft.

29. A hydraulic power transmission mechanism as defined in claim 26, wherein said valve means is operable by movement of the accelerator pedal beyond full open throttle position to render the motor member inoperable to transmit torque to the driven shaft.

30. A hydraulic power transmission mechanism as defined in claim 26, wherein said valve means is operable by the accelerator pedal when moved in a closed throttle direction to render the motor member inoperable to transmit torque to the driven shaft by the circulating fluid.

31. A hydraulic power transmission mechanism as defined in claim 26, wherein said valve means is rendered operable by movement of the accelerator pedal to render the motor member inoperable to transmit torque to the driven shaft by the circulating fluid, and means responsive to the speed of rotation of one of said shafts and operable to again render the motor member operable to transmit torque to the driven shaft.

32. A hydraulic power transmission mechanism as defined in claim 26, including a manual controlling element operable on said valve means to render the motor member inoperable to transmit torque to the driven shaft and subsequently hold the driven shaft from rotation and thereby hold the motor vehicle from movement.

33. A hydraulic power transmission mechanism, comprising driving and driven shafts, hydraulic torque transmitting means for transmitting torque between said shafts including a casing attached to said driving shaft and rotatable thereby, said casing containing fluid, a pump member in said casing and rotatable thereby to circulate the fluid in said casing, a motor member in said casing in the path of and rotatable by the fluid circulating therein to transmit torque to the driven shaft, and a fluid controlled clutch in said casing for connecting said motor member to and disconnecting it from the driven shaft, valve means for controlling said fluid controlled clutch, and a manually operable element for operating said valve means to render said motor member operative or inoperative for transmission of torque to the driven shaft by the circulating fluid.

EDWARD JOHN THURBER.

REFERENCES CITED

The following references are of record in the file of this patent:

UNITED STATES PATENTS

| Number | Name | Date |
|---|---|---|
| 1,846,879 | Kurth | Feb. 23, 1932 |
| 1,918,236 | Baker | July 18, 1933 |
| 2,023,584 | Harvey | Dec. 10, 1935 |
| 2,050,836 | Graham | Aug. 11, 1936 |
| 2,065,737 | Ramsey | Dec. 29, 1936 |
| 2,104,608 | Cox et al. | Jan. 4, 1938 |
| 2,179,518 | Popper | Nov. 14, 1939 |
| 2,182,407 | Phelan et al. | Dec. 5, 1939 |
| 2,187,667 | Sinclair | Jan. 16, 1940 |
| 2,235,370 | Jandasek | Mar. 18, 1941 |
| 2,271,919 | Jandasek | Feb. 3, 1942 |
| 2,280,002 | Neracher | Apr. 14, 1942 |
| 2,296,290 | Mayrath | Sept. 22, 1942 |
| 2,296,642 | Huebner | Sept. 22, 1942 |
| 2,301,957 | Lang | Nov. 17, 1942 |
| 2,326,567 | Root | Aug. 10, 1943 |
| 2,333,674 | Powell | Nov. 9, 1943 |
| 2,449,608 | Le May | Sept. 21, 1948 |